United States Patent Office 3,773,820
Patented Nov. 20, 1973

3,773,820
BIS-CHLOROSULPHONYL DIARYLCARBONATES
AND PROCESS FOR THEIR PREPARATION
Ronald George Feasey, Knebworth, and John Brewster
Rose, Letchworth, England, assignors to Imperial Chemical Industries Limited, London, England
No Drawing. Filed July 15, 1971, Ser. No. 165,770
Claims priority, application Great Britain, July 15, 1970,
34,310/70
Int. Cl. C07c 147/06, 147/10
U.S. Cl. 260—463           4 Claims

ABSTRACT OF THE DISCLOSURE

New bis-chlorosulphonyl diarylcarbonates of the formula $ClSO_2\text{—}Q\text{—}O\text{—}CO\text{—}O\text{—}Q'\text{—}SO_2Cl$ may be made by a process which comprises reacting chlorosulphonic acid ($HOSO_2Cl$) with a diaryl carbonate having the formula $H\text{—}Q\text{—}O\text{—}CO\text{—}O\text{—}Q'\text{—}H$ in which Q and Q' are bivalent aromatic radicals which may be the same or different.

---

This invention relates to diaryl carbonates and in particular to the chlorosulphonation of diaryl carbonates.

According to the present invention, new bis-chlorosulphonyl diarylcarbonates of the formula $$ClSO_2\text{—}Q\text{—}O\text{—}CO\text{—}O\text{—}Q'\text{—}SO_2Cl$$

may be made by a process which comprises reacting chlorosulphonic acid ($HOSO_2Cl$) with a diaryl carbonate having the formula $H\text{—}Q\text{—}O\text{—}CO\text{—}O\text{—}Q'\text{—}H$ in which Q and Q' are bivalent aromatic radicals which may be the same or different.

The aromatic radical, Q, may be any bivalent aromatic radical. The aromatic radical may be derived from an aromatic hydrocarbon such as for example benzene, biphenyl, naphthalene, indene, anthracene, fluorene, acenaphthene, phenanthrene and chrysene, or from a polynuclear heteroaromatic compound such as for example dibenzofuran and dibenzothiophene. Preferred aromatic radicals are those derived from benzene and naphthalene. It is also preferred that Q and Q' are the same. The aromatic radicals may be substituted by any atom or group which is inert to the reaction conditions. Examples are halogen atoms, and alkyl and alkoxy groups containing up to ten carbon atoms.

At with most chemical reactions, a compromise has to be reached between obtaining essentially a single product by performing the reaction at ambient temperature over a long period of time or carrying out the reaction at higher temperatures over a shorter reaction time with attendant risk of a multiplicity of products and product degradation. Accordingly, the condensation reaction of the present invention may be carried out at a temperature between ambient and 200° C., a preferred range being ambient to 100° C. Within such a range of temperature the carbonate group usually restricts reaction to the para-position of the aromatic residue. The reaction may be carried out in an atmosphere of air although the presence of an inert atmosphere, for example nitrogen, is preferred.

The reaction may be carried out either in the absence or presence of a diluent. If no diluent is present, then a molar excess of chlorosulphonic acid may be used as a solvent for the reaction.

If however, a diluent is used, the diluent should be inert to the reaction. Examples of such diluents are carbon disulphide, petroleum ether, ethylene chloride, methylene chloride, chloroform, carbon tetrachloride, nitrobenzene and nitroalkanes such as nitromethane, nitroethane, nitropropane. A preferred diluent is chloroform.

The chlorosulphonated diaryl carbonate produced by the reaction may be isolated and purified from the reaction mixture, for example by pouring the reaction mixture into cold water and extracting the product with a solvent such as for example methylene chloride. The chlorosulphonated diaryl carbonate may be converted into its sulphonyl derivatives such as sulphonamides and sulphonates, by reaction with ammonia or amines and alcohols or phenols respectively. These derivatives may then be converted into the corresponding phenol by hydrolysis using a base, conveniently an alkali metal hydroxide in alcoholic solution, to produce the corresponding phenate, followed by acidification, conveniently by dilute mineral acid, to precipitate the substituted phenol. The phenol may then be washed, conveniently with methanol or ethanol, and may be used wet or may be dried before further use. Substituted phenols so formed may be used as precursors in the preparation of dyestuffs, drugs or antioxidants or as starting materials in the production of polymers.

A particular use of the invention is in further reaction of the chlorosulphonated diaryl carbonate with a chlorinated aromatic hydrocarbon, such as for example chlorobenzene, under Friedel-Craft conditions to form a bis-chloroaryl sulphonyl diaryl carbonate which on hydrolysis and acidification yields a chloroaryl sulphonyl phenol able to be used as a starting material in the production of aromatic polysulphones according to the method described and claimed in British specifiaction 1,153,035.

The invention is illustrated by the following example.

Chlorosulphonic acid (39.6 cm.³; 0.6 mole) was dripped onto stirred diphenyl carbonate (21.4 g.; 0.1 mole). Hydrogen chloride was evolved and the resulting solution was heated to 80° C. for 2.5 hours and then allowed to cool. The reaction mixture was poured into ice/water and the resulting suspension was extracted with methylene chloride. The methylene chloride solution was evaporated to yield a crude product (16.2 g.) which was recrystallised from 1,2-dichloroethane/petrol to yield a white, crystalline compound (13.8 g.) which had a melting point 148.5–150° C. and an infra-red spectrum consistent with bis-(4-chlorosulphonyl phenyl) carbonate:

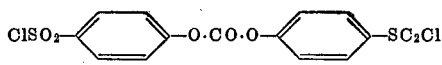

A portion (2.1 g.) of bis-(4-chlorosulphonyl phenyl) carbonate was stirred with chlorobenzene (1.1 g.; 0.010 mole), nitrobenzene (3 cm.³) and anhydrous ferric chloride (0.1 g.) at 140° C. under nitrogen for 6.5 hours. The reaction mixture was poured into methanol and the precipitate was collected, dried and recrystallised from 1,2-dichloroethane. The crystals had a melting point of 200–202° C. and the infra-red and nuclear magnetic resonance spectra were consistent with bis-4-(4-chlorophenylsulphonyl) phenyl carbonate:

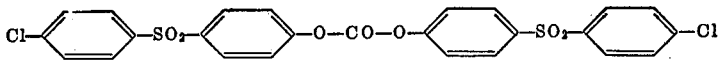

A sample (11.26 g.) of bis-4-(4-chlorophenylsulphonyl) phenyl carbonate was stirred with refluxing alcoholic potassium hydroxide (10.6 g.; 0.16 mole potassium hydroxide pellets in 50 cm.$^3$ ethanol) for 2 hours. The mixture was acidified and the precipitate was collected, washed with water and dried to a white powder (9.83 g.). This material had a melting point 147–150° C. and gave an infra-red spectrum consistent with its being 4-chloro-4'-hydroxydiphenylsulphone.

We claim:
1. A bis-chlorosulphonyl diaryl carbonate of the formula $ClSO_2$—Q—O—CO—O—Q'—$SO_2Cl$ in which Q and Q' are bivalent aromatic radicals which may be the same or different, said radicals being derived from (1) benzene, biphenyl, napthalene, indene, anthracene, fluorene, acenaphthene, phenanthrene, chrysene, dibenzofuran or dibenzothiophene by removal of two ring hydrogens or (2) the corresponding compounds substituted with halogen, alkyl or alkoxy containing up to 10 carbon atoms.
2. A carbonate according to claim 1 wherein Q and Q' are the same and are derived from benzene or naphthalene by removal of two ring hydrogens.
3. Bis-(4-chlorosulphonylphenyl)carbonate.
4. A method for the production of bis-chlorosulphonyl diaryl carbonates as claimed in claim 1 which comprises reacting chlorosulphonic acid with a diaryl carbonate having the formula H—Q—O—CO—O—Q'—H in which Q and Q' are bivalent aromatic radicals which may be the same or different.

References Cited
UNITED STATES PATENTS

| | | | |
|---|---|---|---|
| 1,955,887 | 4/1934 | Neelmeier et al. | 260—543 |
| 2,273,974 | 2/1942 | Meiser | 260—515 |
| 2,626,280 | 1/1953 | Hunter | 260—556 |

FOREIGN PATENTS 1,128,217  9/1968  Great Britain.

LEWIS GOTTS, Primary Examiner

D. G. RIVERS, Assistant Examiner

U.S. Cl. X.R.

260—329.3, 346.2 M, 607 A